May 23, 1961 J. R. HOLLOWAY 2,985,877
DIRECTIVE ANTENNA SYSTEM
Filed Aug. 30, 1954 6 Sheets-Sheet 1

Fig.1.

$$Y = \epsilon^{\frac{x+c}{a}} \quad \begin{array}{l} c = 0 \\ a = 1 \end{array}$$

INVENTOR.
John R. Holloway
BY
ATTORNEYS

May 23, 1961  J. R. HOLLOWAY  2,985,877
DIRECTIVE ANTENNA SYSTEM
Filed Aug. 30, 1954  6 Sheets-Sheet 2

INVENTOR.
John R. Holloway
BY
ATTORNEYS

INVENTOR.
John R. Holloway

INVENTOR.
John R. Holloway
BY
ATTORNEYS

May 23, 1961    J. R. HOLLOWAY    2,985,877
DIRECTIVE ANTENNA SYSTEM
Filed Aug. 30, 1954    6 Sheets-Sheet 6

Fig.22
$\lambda = 1.24$

Fig.23.

MEASURED HIGH FREQUENCY CUT OFF IN $\lambda$, VS. ANGLE "$T$" IN DEGREES $Y = \epsilon^{\left(\frac{x+c}{a}\right)}$  $a=1$  $C=0$  $X_p=1.5$  $X_q=0$ INVENTOR.
John R. Holloway
BY
Roland O. Holloway
ATTORNEYS

United States Patent Office 2,985,877
Patented May 23, 1961

2,985,877

DIRECTIVE ANTENNA SYSTEM

John Rolind Holloway, 1910 Wiley St.,
Hollywood, Fla.

Filed Aug. 30, 1954, Ser. No. 453,021

6 Claims. (Cl. 343—809)

This invention relates to highly directive antenna systems.

Directive antennas have outstanding advantages in the transmission and reception of electro-magnetic energy due to the fact, among other things, that the energy is highly concentrated in the desired direction and thus the efficiency of the antenna is of a high order; to an extent they also eliminate radiation from undesired directions and thus minimize interference. Thus, for multitudinous applications they have been held in high esteem and used extensively.

The usefulness of conventional directive antennas, however, has been seriously curtailed by several limitations which seemingly were inherent in the nature of such antennas. They do not lend themselves to any considerable variation in the operating frequency and hence multiple antennas are necessary where the service entails any substantial variations in operating frequency. Similarly, the input or terminal impedance of such antennas varies over an extremely wide range with variations in operating frequency. Some are bidirectional in character, which detracts from their usefulness, and others, while somewhat unidirectional in character, have substantial back and side radiation which sets up interference and causes lessened efficiency.

Directivity of such antennas is largely confined to one plane and even when so-called stacking of one or more antennas is resorted to, directivity in the other plane, although increased by such combination, is not of an extremely high order. Such "stacking," on the other hand, magnifies the radiation and impedance band width limitations of the antenna.

As hereinafter more particularly related, the objects and purposes of this invention, among other things, are to avoid such limiting and objectionable characteristics of conventional directional antennas and to provide antenna systems having the advantages hereinafter set forth in this application.

It is an object of this invention to provide a family of antenna systems each having constant directional radiation characteristics for all frequencies above a low frequency limit imposed by its physical size.

A further object of this invention is to provide antenna systems each having constant directional radiation characteristics over a broad band of frequencies for which it may be specifically designed.

A further purpose of this invention is to provide unidirectional antenna systems each having no upper frequency limits with respect to such directional characteristics and only such lower limits as are imposed by its physical size.

A further purpose of this invention is to provide antenna systems each having unidirectional radiation characteristics over a broad band of frequencies for which it is specifically designed.

A further purpose of this invention is to provide antenna systems in each of which the input or terminal impedance remains substantially constant over all frequencies above a low frequency limit for such antenna.

A further purpose of this invention is to provide antenna systems in each of which the characteristic impedance is substantially constant throughout the length of the antenna.

A further object of this invention is to provide antenna systems which achieve traveling wave characteristics at frequencies where the ratio of the wave length to antenna length approximates unity.

A further object of this invention is to provide antenna systems having constant directional radiation characteristics over all frequencies above a low frequency limit and which have substantially equal directivity in planes normal to each other.

A further object of this invention is to provide antenna systems having constant directional characteristics over a broad band of frequencies for which they are specifically designed and which have substantially equal directivity in planes normal to each other.

A further object of this invention is to provide antenna systems having unidirectional radiation characteristics over all frequencies above a low frequency limit and which have substantially equal directivity in planes normal to each other.

A further object of this invention is to provide antenna systems having unidirectional radiation characteristics over a broad band of frequencies for which they are specifically designed and which have substantially equal directivity in planes normal to each other.

These objectives and the means of achieving the results of the invention will be better understood from the specification which follows, and from the drawings in which:

Fig. 1 is a graph of an exponential curve according to the equation $$y = \epsilon^{-\left(\frac{x+c}{a}\right)}$$

where $a=1$ and $c=0$; the graph serving as a basis for the explanation of the geometry and the construction of antenna systems embodying the invention.

As hereinafter used, the term "radiation bandwidth" of a directional antenna refers to that band of frequencies over which its principal radiation in the form of a single beam appears in the direction of the axis of the antenna.

As was pointed out above, conventional antennas having highly directional radiation characteristics are inherently subject to severe limitations with respect to radiation bandwidth and in the present state of the art such an antenna having a radiation bandwidth ratio of 2 to 1 in frequency is exceptional.

Such an antenna must be designed for optimum performance at some center or mean frequency, and it operates with impaired performance over the remainder of a narrow bandwidth, beyond which it rapidly deteriorates and loses its desirable directional characteristics.

As an illustration, a conventional V-shaped antenna having straight conductors angularly disposed to each other must be designed for a relatively narrow band of frequencies, the included angle of the V formation changing rapidly with frequency and the length of the conductors employed. All other highly directional beam antennas have similar limitations and are highly frequency conscious.

The removal of such frequency limitations would extend the usefulness of directional antennas immeasurably.

My invention lies in part in the discovery that a combination of exponentially curved conductors, in proper combination and alignment, produces a highly directive and efficient antenna system with none of the radiation bandwidth limitations that are inherent in antennas designed according to the known art.

In the basic form of my invention two conductors are employed whose "center lines" describe an exponential curve the maximum tangent angle of which has a value of 45 degrees. The term "tangent angle" of a curve as herein used shall mean the acute angle which in the graph of the curve is formed by the X axis and a line tangent to the curve at any point on the curve. The terms "maximum" and "minimum tangent angles" of the curve shall mean those acute angles formed by such axis and lines tangent to the curve at its respective ends, the maximum angle being the one having the greater value and the minimum the lesser.

The term "center line" of the conductor as used herein means the electrical center line, i.e., that line extending lengthwise of the conductor and to which the magnetic field or "H lines" of the conductor when energized, are concentric. Where the conductor is linear or its cross-sectional geometry is symmetrical, this line is identical with the geometric longitudinal center line of the conductor.

Figure 1:
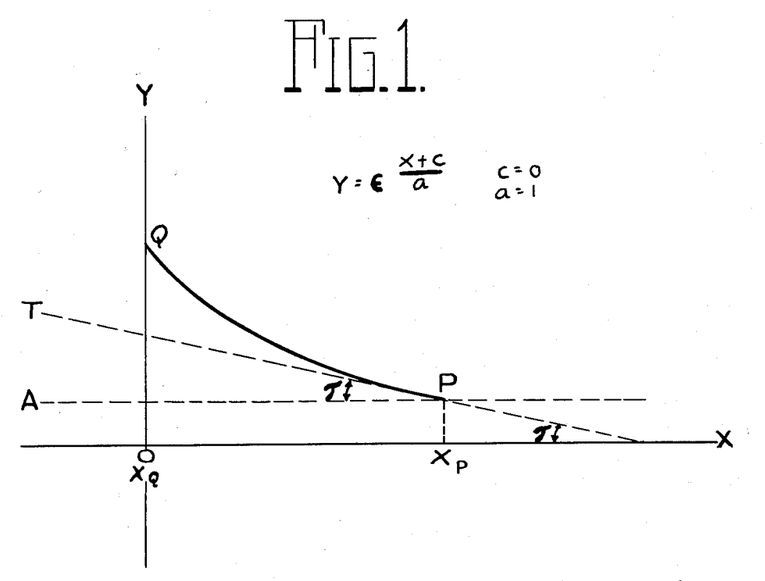

Fig. 1 is a graph of the rectangular system of coordinates of an exponential curve, according to the equation $$y = \epsilon^{-\left(\frac{x+c}{a}\right)}$$

where $\epsilon$ is the base of natural logarithms, $a=1$ and $c=0$.

In the figure "O" is the point of origin, "OX" and "OY" are the X and Y axes respectively, "Q" and "P" are the limits of the curve and "$X_q$" and "$X_p$" are the limiting values of X. TP is a line tangent to the curve at the point P and $\tau$ is the acute angle made by the intersection of the tangent line TP and the X axis, and also by the intersection of such tangent line and the line AP which is parallel to the X axis.

The term "normal $\tau$ angle" as hereinafter used means the acute angle between the tangent line TP and the X axis, or between the line TP and the line AP in the graph of the equation employed. Such normal $\tau$ angle is identical with the minimum tangent angle hereinbefore defined. The term "$\tau$ angle" as hereinafter used, with respect to the positioning of the center line of a conductor of any antenna of this invention means the acute angle formed by a line tangent to the curve of the center line at its apex end and a line parallel to the axis of the antenna and passing through such apex end.

When a conductor of any antenna of this invention is positioned so that the line tangent to its center line at its apex end is parallel to the axis of the antenna, the value of the "$\tau$ angle" in such set position is zero.

If the center line of the conductor is rotated about its apex end from the zero "$\tau$ angle" position away from the axis of the antenna, the resulting "$\tau$ angle" is regarded as having a positive value. Conversely, if the center line is rotated toward the antenna axis, the resulting "$\tau$ angle" is regarded as having a negative value.

Figure 2:
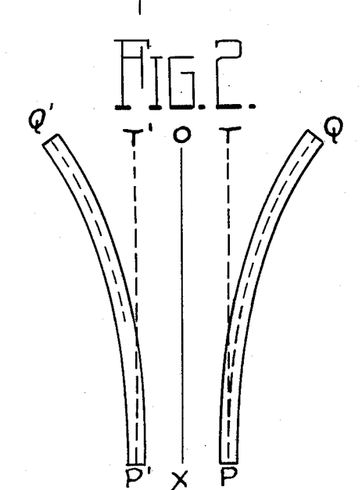
Fig. 2 is a plan view of an antenna system constituting an embodiment of the invention and having two linear type conductors.
Figure 3:
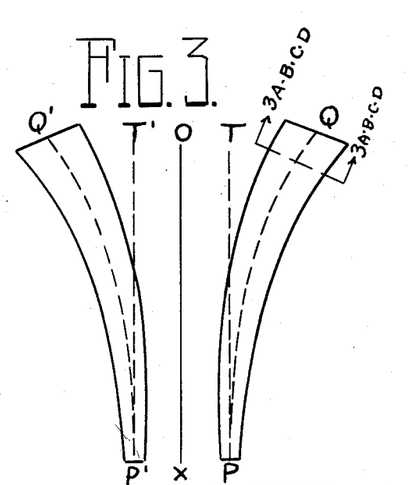
Fig. 3 is a plan view of another antenna embodying the invention and having two expanded type conductors.
Figures 3A, 3B, 3C:
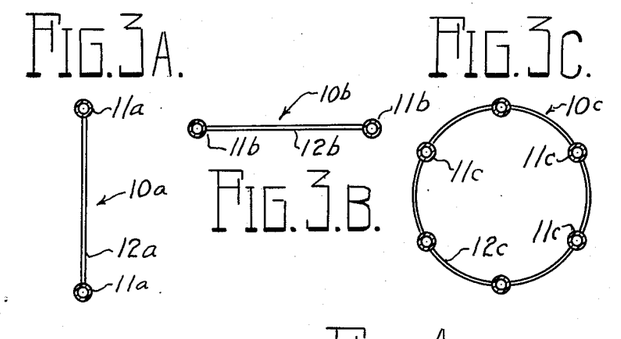
Figs. 3A, 3B, 3C and 3D are cross sectional views taken along the section lines 3ABCD—3ABCD which are illustrative of variations in the cross sectional geometry of the expanded type conductor.
Figure 3D:
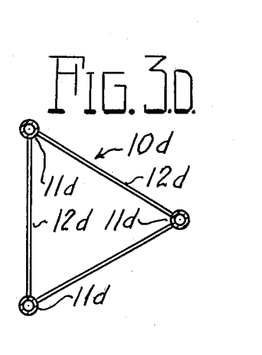

Figs. 2 and 3 illustrate designs of two conductor antennas, the center lines of whose conductors describe exponential curves according to the above equation and where $X_p$ has any positive value and $X_q$ equals zero, thus setting the maximum tangent angle of the curve at 45 degrees. The center lines of the conductors QP and Q'P' are symmetrically disposed in a common plane on opposite sides of common axis OX, lying in such plane. The points P and P' are spaced so as to accommodate the energy transfer device to which the antenna is connected and such spacing may vary over a considerable range. Input impedance considerations and the effect of too narrow spacing on the radiation capabilities of the conductors in this area are factors that dictate the desirable spacing in any given case. The ends of the conductors and the ends of their center lines at P and P' are herein referred to as the apex ends and the ends at Q and Q' as the aperture ends. The letters P, P', Q and Q' are selected to denominate the ends of the conductors in Figs. 2 and 3 and in all other figures, because these respective ends correspond to the ends of the curve of Fig. 1.

The position of the conductors of each antenna relative to the axis of the antenna OX is such that the line TP, tangent to the curve at P is parallel to the axis of the antenna, in which case the $\tau$ angle is zero degrees.

The conductors of each antenna are fed in phase opposition to each other at the apex ends by means of a transmission line or other energy transfer device and the antennas can be thus used either for transmission or reception of electromagnetic energy.

Fig. 2 illustrates the linear type of conductor having a constant diameter throughout its length. The diameter of such a conductor may vary with the specific design, from that of a thin wire to any practical diameter.

Fig. 3 illustrates the expanded type of conductor, the manner of expansion of which will be hereinafter described.

In the combination and alignment above-described that is common to the antennas of Figs. 2 and 3, the principal radiation of these antennas appears as a relatively narrow beam of energy in the direction of the axes of the antennas.

This directive characteristic remains constant over all frequencies above a low frequency limit where the communication wave length approximates the length of the antenna.

The low frequency limit actually does not exist if it is considered that it is imposed only by the finite length of the antenna and could be extended indefinitely were it convenient or practical to extend the physical length of the conductors.

Polar field patterns of the antenna of Fig. 3 are shown in Figs. 12 to 21 inclusive, covering a range of 1.3λ to 17.6λ. An examination of these patterns discloses that the beam continues intact throughout this wide range with back and side radiation reduced to an extremely low order, resulting in a true unidirectional pattern with exceptionally narrow half-power beam widths in the upper portion of the range.

In Fig. 1, the graph of the equation $$y = \epsilon^{-\left(\frac{x+c}{a}\right)}$$

the value of the term "$a$" is set at unity, "$c$" at zero and $X_q$ at zero, to illustrate an exponential curve whose maximum tangent angle is 45 degrees. This simplification of the formula is employed to facilitate an easy understanding of the explanation and the application of the formula to the physical structure.

The fact is however that any value may be assigned to "$a$" and "$c$" provided the maximum tangent angle of the curve has a value of 45 degrees and if the minimum tangent angle of the curve is held constant through all variations in such terms the resulting exponential curves will be identical. Of course with such variations, $X_q$ and $X_p$ values in the graphs of such curves will vary from those shown in the graph of Fig. 1 but the character of the exponential curve is the same. Although the base $\epsilon$ is used in the equation, it may also be noted that any other base may be substituted for $\epsilon$ in the equation without affecting the nature of the curve providing the proper value is assigned to "$a$" to make the two expressions equivalent.

The significant fact is that irrespective of the values assigned to the terms of the equation used to define the curve, the center lines of the conductors are made to describe an exponential curve whose maximum tangent angle has a value of 45 degrees with the minimum tangent angle a variable.

Figure 4:
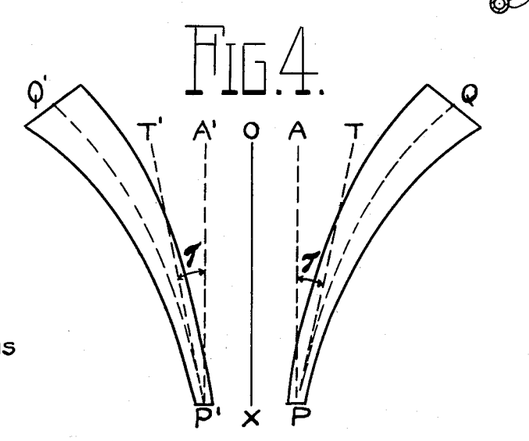
Fig. 4 is a plan view of a two conductor antenna embodying the invention and illustrating how the band pass characteristics of antennas embodying the invention may be modified by the relative positioning of the conductors.

Fig. 4 illustrates an antenna of the same design as those of Figs. 2 and 3 except that the conductors are so positioned that the $\tau$ angle takes some value other than zero degrees, QP and Q'P' are the center lines of the conductors, OX is the axis of the antenna, TP is a line tangent to the curve at P, $\tau$ is the angle made by the intersection of such tangent line and the line AP parallel to the axis and is variable as hereinbefore related. An expanded type of conductor is shown in Fig. 4, but conductors of any cross-sectional geometry may be used.

Figure 12:
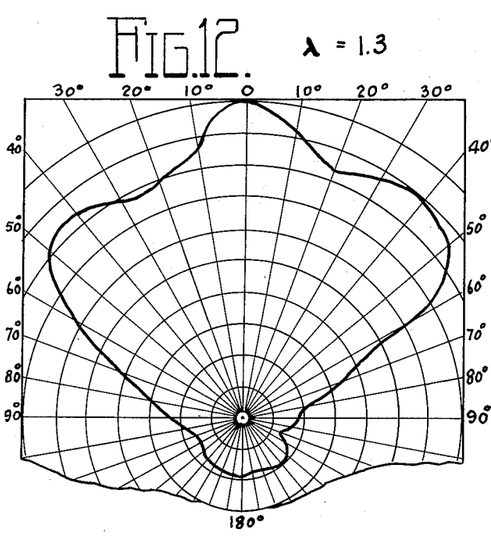
Figs. 12-21 are polar field patterns of the antenna shown in Fig. 3 illustrating the performance of such antenna over a range of from 1.3λ to 17.6λ.
Figure 13:
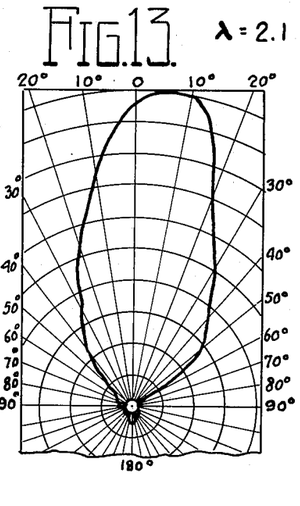
Figure 14:
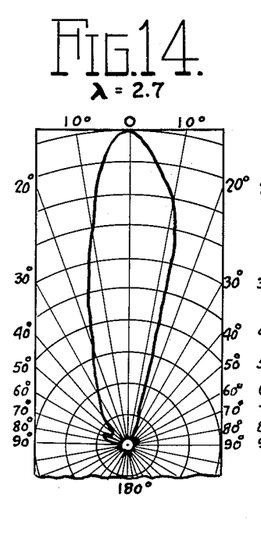
Figure 15:
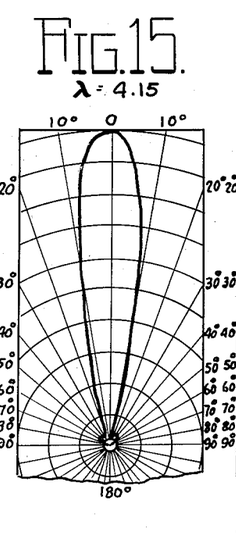
Figure 16:
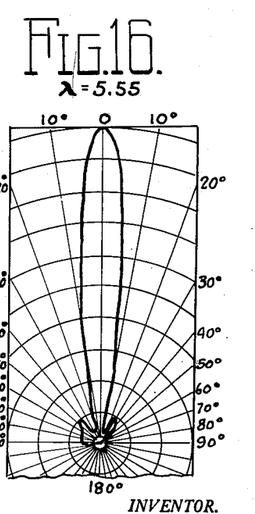
Figure 17:
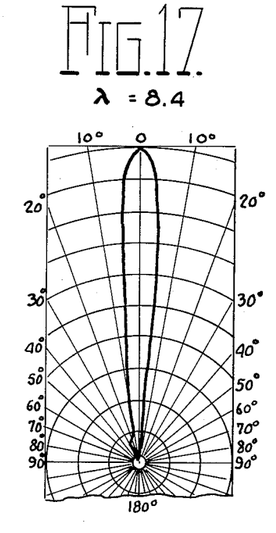
Figure 18:
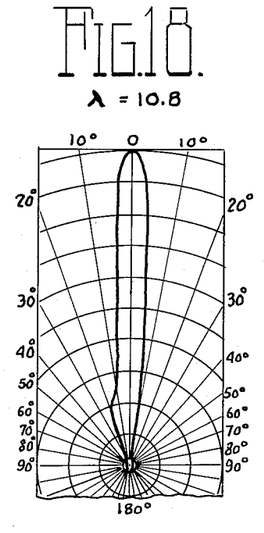
Figure 19:
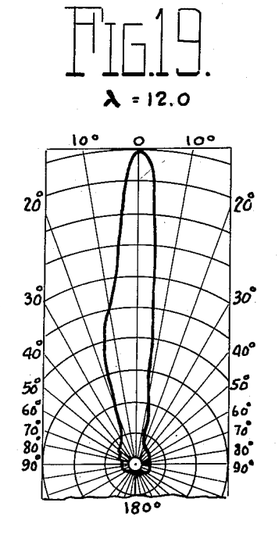
Figure 20:
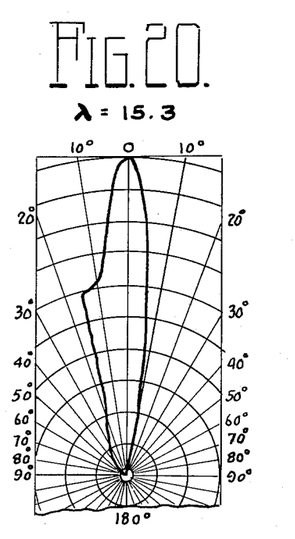
Figure 21:
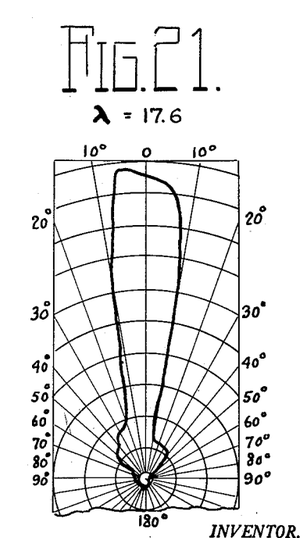
Figure 22:
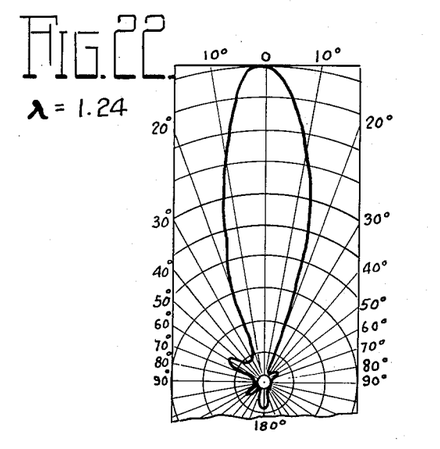
Figs. 22 is a polar field pattern of the antenna of Fig. 4 illustrating the performance of such an antenna under certain conditions.

If the conductors are so positioned that the angle is greater than zero, somewhat better performance is obtained in the region of normal low frequency cut off and below than at the zero setting as may be seen from a comparison of the patterns of Fig. 12 and Fig. 22 which were taken at comparable frequencies. In Fig. 12 the conductors are set at zero $\tau$ angle and in Fig. 22 they are set at a positive $\tau$ angle, in this instance slightly in excess of the "normal" $\tau$ angle. Such a positive $\tau$ angle setting, however, imposes a high frequency limit and the antenna becomes a wide band pass antenna with upper and lower frequency limits. These limits vary with the variation of the $\tau$ angle from zero. For example, an antenna whose $X_p$ value is 1.5, has a normal $\tau$ angle value of 12° 34'; with its conductors positioned at the normal $\tau$ angle, the radiation bandwidth is approximately of the ratio of 7 to 1.

Figure 23:
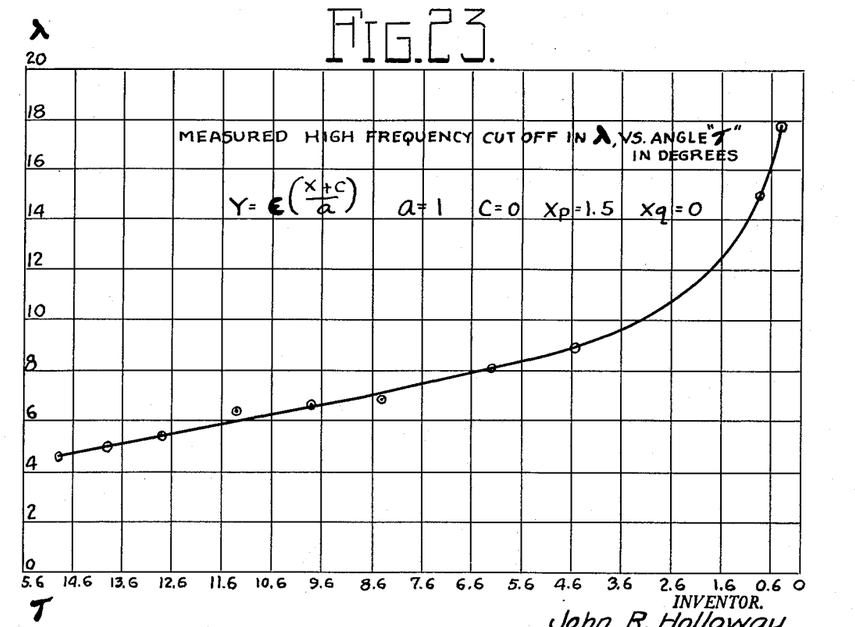
Fig. 23 is a graph illustrating variations in upper frequency limits in the bandwidth of antenna embodying the invention in response to changes in relative positioning of the conductors.

Variations in bandwidth with changes in $\tau$ angle are shown graphically in Fig. 23 where an antenna of Fig. 4 having an $X_p$ value of 1.5 was under investigation. The points encircled on the curve denote the upper frequency limit of each setting of the $\tau$ angle. From the nature of the curve it will be seen that as the $\tau$ angle approaches zero, the bandwidth approaches infinity as a limit and hence it follows that the zero position removes all upper frequency limits. From this it can be reasonably concluded that although the directional radiation pattern is a resultant of the operation of the two conductors in combination, the contribution of each conductor seeks to follow the direction of its tangent line TP and as the beam becomes sufficiently narrow with increase of frequency, splitting of the beam occurs and changes in the $\tau$ angle become necessary to keep the beam intact.

An antenna whose $X_p$ value is 2.0, has a normal $\tau$ angle value of 7°42'; with its conductors positioned so that the $\tau$ angle is at its normal value, the antenna's radiation bandwidth is of the ratio of 10:1. An antenna whose $X_p$ value is 2.5, has a normal $\tau$ angle of 4°42'; with its conductors positioned at the normal $\tau$ angle value, it has a radiation bandwidth in excess of 12 to 1. In practice $\tau$ angles having values between zero and 45° may be used in positioning the conductors with varying radiation bandwidths and varying performance in the low frequency region of 1 λ and below.

If the conductors are rotated about the point P, toward the axis of the antenna beyond the zero $\tau$ angle to a negative $\tau$ angle, the performance of the antenna rapidly deteriorates. It is impractical from the standpoint of antenna performance and because of structural reasons to continue rotation beyond a point where the $\tau$ angle exceeds a negative value of 5 degrees.

It will be observed that the radiation bandwidths just mentioned are far in excess of those of conventional directive antennas and where the service can tolerate band pass antennas, because of the improved performance in the low frequency region, this antenna is highly useful and desirable.

In the graph of Fig. 1, the curve of the equation lies between the limiting values of $X_q$ and $X_p$ where $X_q=0$ and $X_p$ is a variable which theoretically may approach infinity as a limit. However, in practice, $X_p$ values of 1.5, 2.0, 2.5 and larger are practical design values with some variance in the low frequency limit, depending on the $X_p$ values used as well as the physical size of the antenna.

As the value of $X_p$ is increased, the minimum tangent angle or normal $\tau$ angle value decreases, so that less "compensation," i.e., rotation of the conductors about the point P, toward the axis of the antenna, is required to make the tangent line TP parallel to the axis and thus align the conductors in their proper position for optimum radiation bandwidth.

As the $X_p$ value is carried to infinity, the minimum tangent angle or normal $\tau$ angle value approaches zero as a limit, no "compensation" is necessary and theoretically the antenna would be without frequency limitations. For all practical purposes, the $X_p$ value should be limited so the minimum tangent angle or normal $\tau$ angle is greater than 1°.

Where a fixed conductor length is assumed, $X_p$ values of the order of 2.5 have desirable performance characteristics, particularly in the region of low frequency cut off and may be satisfactorily operated over a wider radiation bandwidth without any "compensation" than where lesser values of $X_p$ are employed.

Considerable range in the diameter of the conductors in Fig. 2 is permissible. If a thin linear conductor is employed, the antenna does not take on traveling wave characteristics until the region of 7 λ is reached. At lower frequencies reflections occur, and back radiation is present the magnitude of which varies with frequency. If the diameter of the conductor is increased, reflections and back radiation diminish and the radiation pattern takes on unidirectional characteristics. Prior art teaches that for any shape of cross section of a linear conductor there is an equivalent electrical radius and that where the conductor is not linear it has an average equivalent radius which is related to its electrical characteristics. The latter term "average equivalent radius" will be hereinafter employed as it applies to all types of conductors. In the antennas of Figs. 2 to 8, inclusive, if the ratio of the average equivalent radius of the conductor to the conductor length is not in excess of 1 to 100 the antenna assumes travelling wave characteristics and becomes unidirectional in character.

The antenna of Fig. 3 achieves unidirectional characteristics by the expansion of its conductors from the apex end of the conductor to its aperture end. While improvement in the radiation pattern results from expansion in any manner, two methods are preferable. If the conductors are expanded in an exponential manner, dissipation of energy by the antenna tends to take place in a more linear manner, and becomes complete at a relatively low frequency above which the antenna has the essential characteristics of unidirectivity.

The preferred manner of expansion, however, is achieved by keeping the ratio of the equivalent radius of the cross-sectional area of the conductors to the separation of the longitudinal center lines of the conductors constant throughout the antenna.

It has sometimes been assumed that by keeping this ratio constant, constant characteristic impedance results, irrespective of the conformation of the conductors or the manner of their separation. However, whenever radiation is present, the shunt conductance of any conductor has a value other than zero due to radiation losses, and the characteristic impedance is complex, that is, it has a reactive component where the series ohmic resistance is essentially zero. In the absence of any corrective measures the characteristic impedance changes along the conductors and reflections occur. However, if the conductance is made to vary exponentially as a linear function of X, as a result of the conformation of the conductors and their manner of separation, the change in the reactive term of the complex characteristic impedance will also be exponential and reflections will be substantially eliminated.

The net result of this manner of expansion of the conductors is that no discontinuities due to impedance changes appear along the conductor and reflections of energy due to such discontinuities are eliminated. If, in addition, the conductors are of such length and the aperture ends are of such size that dissipation of energy becomes complete by the time it reaches the aperture end of the conductor, no reflections occur and the antenna becomes truly unidirectional.

In the antenna of Fig. 3, the conductors are expanded with a constant ratio of equivalent radius of cross section to separation of center-lines, and it achieves these results and is unidirectional with no appreciable back radiation over all frequencies above a low cut off frequency where the length of the communication wave approximates that of the conductor. The patterns of Figs. 12 to 21, illustrate this characteristic and has been pointed out, side and back radiation, as these patterns disclose, is of a very low order.

As a further result of expanding the conductors of Fig. 3 and particularly by the method just described, the terminal or input impedance of the antenna remains substantially constant over frequencies above a low frequency limit similar to that just described.

The size of the aperture end of the conductor may vary over a considerable range. Where the cross sectional area of the aperture end is such that the ratio of the diameter of an equivalent circle, to the conductor length is 1 to 10, the resulting performance is very satisfactory. A substantial degree of control of the value of the input or terminal impedance may be had by varying the size of the aperture end of the conductor and thus the overall size of the conductor.

The antenna of Fig. 3 has the following performance characteristics:

(1) A unidirectional radiation pattern over all frequencies above a low cut off frequency.

(2) Linear increase of gain with increase of frequency or length of antenna.

(3) Essentially constant input or terminal impedance over all frequencies above a low frequency limit.

By employing the same methods of expansion to conductors of the antennas illustrated in Figs. 4, 5, 6, 7 and 8, similar results will be obtained, except as such results may be modified by the band pass characteristics of these antennas.

Figure 5:
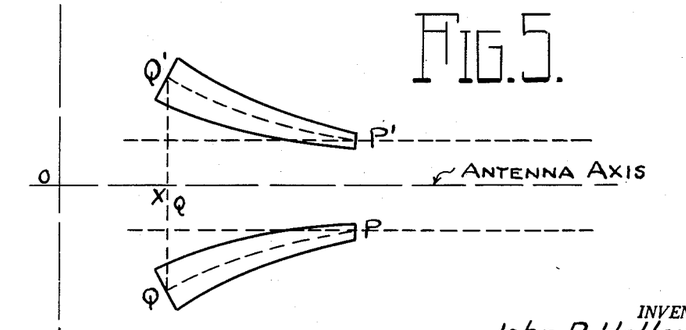
Fig. 5 is a plan view of a two conductor antenna embodying the invention in the design of which "$X_q$," one of the limiting values of X in the foregoing equation, has a positive value.

If in the design of the antennas heretofore described, $X_q$ in Fig. 1 is of some positive value greater than zero, so that the maximum tangent angle of the curve has a value less than 45 degrees, it has the effect of raising the low frequency cut off of the antenna and from that standpoint is less desirable. Its radiation bandwidth, with its conductors positioned at the zero $\tau$ angle setting, however, has no upper limit and is of such an order as to make it a useful antenna. Fig. 5 illustrates such an antenna, QP and Q'P', being the longitudinal center lines of the radiators respectively, which as illustrated, are of the expanded type, and OX, the axis of the antenna. In the case illustrated $X_q$ has a value of .287, $X_p$ 1.5 and the maximum tangent angle is 37 degrees.

If $X_q$ in Fig. 1 is assigned some negative value, so that the tangent angle at the point Q exceeds 45 degrees and the center lines of the conductors are made to conform to such change, the desirable constant directivity characteristic of the antenna is at once disturbed. It no longer has unlimited upper frequency limits as in the case of antennas of Figs. 2 and 3, although its conductors be positioned wth respect to the axis in the same manner as the antennas of Figs. 2 and 3. This effect becomes apparent even with the addition of relatively small negative values to $X_q$, $X_p$ being held constant.

Figure 6:
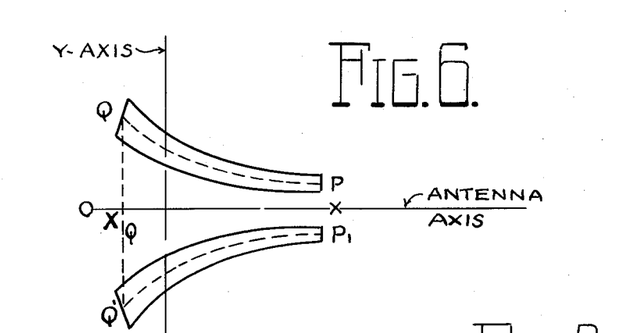
Fig. 6 is a plan view of a two conductor antenna embodying the invention in the design of which "$X_q$" has a negative value.

As an illustration, where $X_q$ was assigned a value of negative .3 thus making the maximum tangent angle of the curve have a value of 53° 29' and with $X_p$ set at 1.5, the upper limit of the radiation bandwidth was found to be 6λ, instead of infinity, although the conductors were compensated to zero $\tau$ angle. Where the conductors of such antenna were positioned at the normal $\tau$ angle the upper limit of its radiation bandwidth was 3λ, a considerable decrease from the situation where the $X_q$ value was zero. This effect becomes more pronounced as the negative value of $X_q$ is increased. However, if the conductors are positioned at the normal $\tau$ angle improved performance is noticeable in the region of 1λ and below and, notwithstanding the antenna's curtailed upper limit, it is useful in certain applications. It should also be noted that with suitable variations in the maximum and minimum tangent angle values this antenna will have multiple response characteristics with respect to radiation bandwidth, which is of considerable advantage in certain applications. Fig. 6 illustrates such an antenna with $X_q$ set at a negative value. The same symbols are used in this figure as in Figs. 2, 3, 4 and 5 for purposes of identification of the axis and center lines.

If some value other than zero is assigned to the term "c" in the equation, it has the effect of including within the assigned limiting values of X, a portion of the curve other than where "c"=0. As a matter of convenience, therefore, changes in the parameter "c" are expressed herein by setting "c" at zero and varying the limiting values of X.

If, in the equation $$y = \epsilon^{-\left(\frac{x+c}{a}\right)}$$

of Fig. 1, the term "a" is assigned a positive value other than one and $X_q$ is set at zero the maximum tangent angle of the curve will be either greater or less than 45 degrees depending upon whether the value of "a" is less or greater than unity. Likewise, with $X_p$ values set at a constant value the minimum tangent angle values will vary with such changes in "$a$," so that the actual limits of the curve as defined by their maximum and minimum tangent angles are expanded or contracted as "$a$" is varied if $X_q$ and $X_p$ are held constant. The result is that where "$a$" is varied from its setting of unity the performance of the antenna varies as in the case of the antenna of Figs. 5 and 6 where limits of the curve were varied by increasing and decreasing the values of the maximum tangent angles by changing the value of $X_q$ in the graph of Fig. 1.

For example, an antenna designed according to the equation of Fig. 1 with "$a$" assigned a value of 1.33 and with $X_q$ set at zero and $X_p$ at 1.5, has a radiation bandwidth with a frequency ratio of approximately 1 to 6 with its conductors positioned at the normal $\tau$ angle. Its performance suffers somewhat in the low frequency region but over the frequency band for which it is designed it is efficient and useful. It will be noted that the maximum tangent angle of the curve of the center lines is 36° 56' and thus the antenna and its performance is comparable to that of the antenna of Fig. 5.

Where in the formula of Fig. 1 "$a$" is assigned a value less than unity such as .66 with $X_q$ set at zero and $X_p$ at 1.5, the radiation bandwidth has a frequency ratio of approximately 1 to 3.2 with its conductors positioned at the normal $\tau$ angle. In this case the maximum tangent angle of the curve is 56° 34' and thus the antenna and its performance is comparable to that of the antenna of Fig. 6.

From the foregoing, it is apparent that optimum bandwidth is obtained in antennas having conductors with a maximum tangent angle of 45°, and performance drops substantially when the maximum tangent angle of the conductors is less than 35° or greater than 55° so these are practical limits for wide bandwidth performance.

Figures 7, 8, 9, 10, 11:
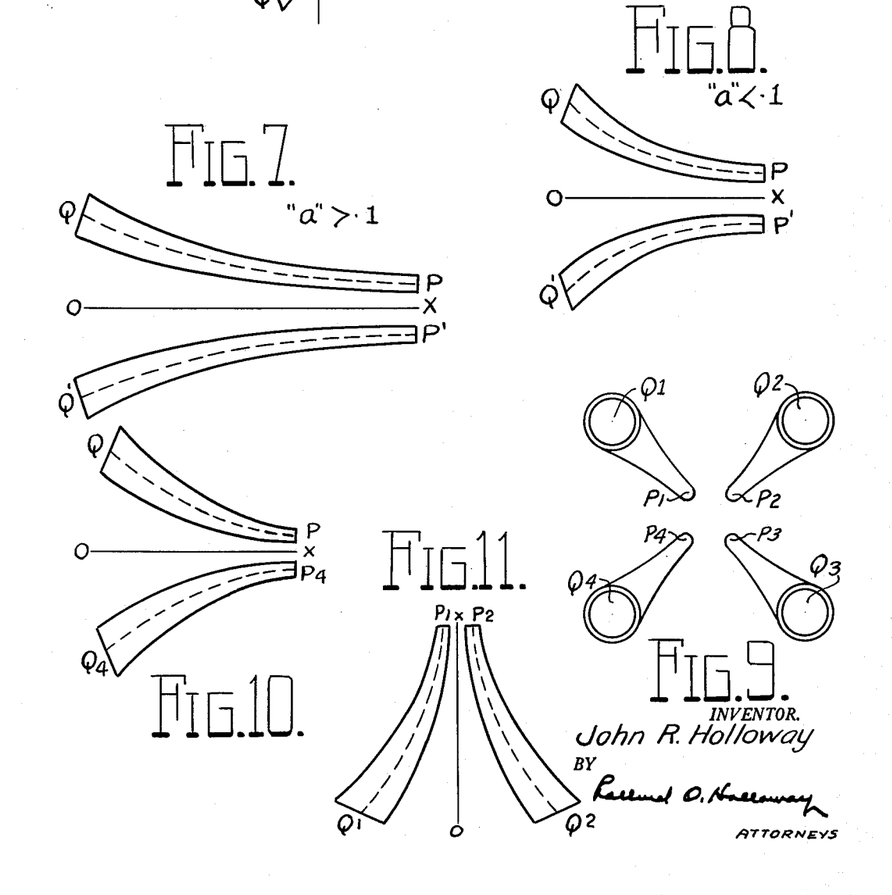
Fig. 7 is a plan view of a two conductor antenna embodying the invention in the design of which "$a$," one of the terms in the foregoing equation, has a value greater than 1.
Fig. 8 is a plan view of another antenna embodying the invention in the design of which "$a$" has a value less than 1.
Fig. 9 is an aperture view of a combination of two identical antenna systems each embodying the invention.
Fig. 10 is a side elevation of the combination shown in Fig. 9.
Fig. 11 is a plan view of the combination shown in Figs. 9 and 10.

Fig. 7 illustrates a two conductor antenna designed according to the formula except that "$a$" in the equation is assigned a value greater than unity. The center lines and axis of the antenna are identified in the figure by the same symbols employed in the former figures.

Fig. 8 illustrates a two conductor antenna designed according to the formula except that "$a$" in the equation is assigned a value less than unity. The same symbols are used in this figure as in Fig. 7.

Variations in the positioning of the conductors of the antennas of Figs. 7 and 8 with respect to the antenna axis may be employed as in the antennas previously described, to modify the radiation bandwidths and performance characteristics.

The conductors of any of the antenna systems heretofore described may take any cross sectional geometry desired. Fig. 2 illustrates conductors of circular cross section. Figs. 3 to 8, inclusive, are of the expanded type whose cross section may be that of any geometric figure. To illustrate the wide range such cross sectional geometry can take, cross sectional views are shown in Figs. 3A, 3B, 3C and 3D. In these figures each of the conductors $10a$, $10b$, $10c$ and $10d$ is composed of two or more structural elements $11a$, $11b$, $11c$ or $11d$ which are supported relative to each other along their lengths by struts or frame members $12a$, $12b$, $12c$ or $12d$, respectively. The underlying principles of the invention are not dependent on the cross sectional geometry of the conductors.

In the construction of the conductors of such antenna systems, conducting material in the form of solid or perforated sheet metal, screen, wire, rods, tubing or similar material may be used. In certain applications it will be desirable to simulate a solid surface insofar as electrical characteristics are concerned, by the use of rods or tubing with suitable transverse spacers for support.

The antennas of the present invention are capable of being combined in multiple units in the same manner in which prior art antennas are utilized in combination with similar or auxiliary units. In particular the well known technique of "stacking" a plurality of like antennas is readily applied to the present antennas. Furthermore, added advantages can be achieved by combining antennas constructed according to the invention in a manner set forth below.

Figs. 9, 10 and 11 illustrate another embodiment of my invention comprising a combination of two antennas of the same design, selected from any of the antenna systems heretofore described.

An aperture view of such a combination is shown in Fig. 9 with a side elevation in Fig. 10 and a plan view in Fig. 11. The conductors $P_1Q_1$ and $P_3Q_3$ form one antenna of the two conductor type previously described while the conductors $P_2Q_2$ and $P_4Q_4$ form another two conductor antenna. The planes passing through the center lines of the pair of conductors of each system ($P_1Q_1:P_3Q_3$ and $P_2Q_2:P_4Q_4$) are positioned normal to each other with the center lines of the conductors symmetrically disposed about a common axis which is the line of intersection of such planes. This common axis is likewise co-incident with the individual axes of the two systems. OX in Fig. 12 is the common axis of the antenna.

The formula for determining the curve of the center lines of the conductors and the positioning of the conductors with respect to the common axis are identical with those heretofore set forth in the description of the antenna systems selected to be used in this combination.

A transmission line or other energy transfer device is connected to the apex ends of the conductors at $P_1$, $P_2$, $P_3$ and $P_4$. The array can be fed in one of three different ways with varying results as to polarization and radiation pattern. When a pair of adjacent conductors are fed in phase opposition to the other pair, polarization in the plane passing through the common axis and symmetrically disposed between such adjacent conductors results. If the array is so positioned with respect to the earth that a line connecting the aperture ends of the center lines of any two adjacent conductors, is in a vertical position, by selecting the appropriate pairs of adjacent conductors to be fed in opposing phase, either horizontal or vertical polarization can be obtained.

The array has the same general directive radiation bandwidth characteristics as those of the particular two-conductor system selected for use in the array. In addition, the array has essentially the same directivity in both the horizontal and vertical planes when the array is positioned in the manner just described and the overall gain of the array is of an extremely high order. The principal radiation of the array is in the direction of the common axis and the radiation bandwidth is comparable to that of the particular antenna system used in the array.

If a pair of non-adjacent conductors of the array are fed in phase opposition to the other pair, in general, cancellation results in the direction of the common axis.

The performance characteristics of the array using a combination of two antennas according to Fig. 3 are as follows:

(1) Unidirectional radiation pattern over all frequencies above a low cut off frequency imposed by the physical size of the array.

(2) Substantially the same directivity in both horizontal and vertical planes with resultant high gain performance.

(3) Essentially constant input or terminal impedance over all frequencies above a low cut off frequency.

(4) Linear increase of gain with increase of frequency or length of the array.

(5) Inherent capability of controlling polarization and radiation pattern by modifying the manner of feeding the array.

If the two antenna systems comprising the array are relatively rotated about the axis so that the planes of the center lines of the two pairs of conductors are at other than a normal position to each other directivity in one of the planes is reduced. Some deviation from such normal position may be tolerated but loss in the efficiency of the antenna results. Variations from the normal position in excess of 30° are impractical from the standpoint of antenna performance.

It should be noted also that this method of combining two individual antenna system into an array to form a four conductor directional antenna has striking advantages over the conventional practice of "stacking" two or more antennas to form an array. In the latter case the gains achievable are not comparable to those of this array due to the order of directivity of this array in both planes; furthermore, most "stacked" arrays not only have inherent radiation and impedance bandwidth limitations of the individual antennas comprising the array, but in addition, suffer severe frequency limitations from the frequency conscious transformers joining the individual antennas of the array. Further radiation bandwidth limitations result in such an array due to the critical requirement of the spacing between the antennas of such an array.

The manner of combining separate antenna systems as illustrated in Figs. 9–11 avoids such limitations and results in a highly efficient and gainful array.

Having described the invention, I claim:

1. An antenna system having a wide radiation bandwidth comprising two conductors the cross sectional area of each of which is expanded progressively from its apex end to its aperture end and each of the center lines of which describes an exponential curve, such center lines lying in a common plane and being symmetrically disposed about a common axis in such plane, the apex ends of said conductors being separated at least the width of the energy transfer device to which they are connected, said conductors from their aperture ends curving toward such axis for at least a portion of their lengths, said conductors being so positioned with respect to such axis that tangents to said center lines form an angle with said common axis of not less than negative 5° and not more than positive 45°, and means for feeding said conductors at their apex ends in phase opposition to each other.

2. An antenna system having a wide radiation bandwidth comprising two conductors, the cross sectional area of each of which is expanded exponentially from its apex end to its aperture end and each of the center lines of which describes an exponential curve, such center lines lying in a common plane and being symmetrically disposed about a common axis in such plane, the apex ends of said conductors being separated at least the width of the energy transfer device to which they are connected, said conductors from their aperture ends curving toward such axis for at least a portion of their lengths, said conductors being so positioned with respect to such axis that tangents to said center line form an angle with said common axis of not less than negative 5° and not more than positive 45°, and means for feeding said conductors at their apex ends in phase opposition to each other.

3. An antenna system having a wide radiation bandwidth comprising two conductors, each of the center lines of which describes an exponential curve, the cross section of said conductors being expanded from their apex ends to their aperture ends at a rate such that the ratio of the equivalent radius of a cross section of each of said conductors to the separation of the center lines of said conductors at such cross section is constant throughout the length of said conductors.

4. An antenna system having a wide radiation bandwidth comprising two conductors, each of the center lines of which describes an exponential curve, the cross section of said conductors being expanded from their apex ends to their aperture ends at a rate such that the ratio of the equivalent radius of a cross section of each of said conductors to the separation of the center lines of said conductors at such cross section is constant throughout the length of said conductors, such center lines lying in a common plane and being symmetrically disposed about a common axis in such plane, the apex ends of said conductors being separated at least the width of the energy transfer device to which they are connected, said conductors from their aperture ends curving toward such axis for at least a portion of their lengths, said conductors being so positioned with respect to such axis that tangents to the apex ends of said center lines form an angle with said common axis of not less than negative 5 degrees and not more than positive 45 degrees, and means for feeding said conductors at their apex ends in phase opposition to each other.

5. A directive antenna having a wide radiation bandwidth comprising a pair of conductors, each of the center lines of which describes an exponential curve having a minimum tangent angle greater than 1 degree and a maximum tangent angle between 35 degrees and 55 degrees relative to the X-axis of the co-ordinates for the curve, said conductors being symmetrically disposed in a common plane at a $\tau$ angle of between negative 5 degrees and positive 45 degrees with respect to a common axis in said plane, where the minimum tangent angle is the acute angle formed by a line tangent to the apex end of said curve and the X-axis of the graph of said curve, and the maximum tangent angle is the acute angle formed by a line tangent to the aperture end of said curve and the X-axis of the graph of said curve and where the $\tau$ angle is the acute angle formed by a line tangent to the apex end of said curve and said common axis.

6. A directive antenna comprising a pair of conductors, each of the center lines of which describes an exponential curve having a minimum tangent angle greater than 1° and a maximum tangent angle of 45° relative to the X-axis of the co-ordinates for the curve, said conductors being symmetrically disposed in a common plane and a $\tau$ angle of between negative 5° and positive 45° with respect to a common axis in said plane where the minimum tangent angle is the acute angle formed by a line tangent to the apex end of said curve and the X-axis of the graph of said curve, and the maximum tangent angle is the acute angle formed by a line tangent to the aperture end of said curve and the X-axis of the graph of said curve and where the $\tau$ angle is the acute angle formed by a line tangent to the apex end of said curve and said common axis.

References Cited in the file of this patent
UNITED STATES PATENTS

| | | |
|---|---|---|
| 1,927,522 | Lindenblad | Sept. 19, 1933 |
| 2,379,260 | Sprague | June 26, 1945 |